United States Patent
Ferlin

(10) Patent No.: US 7,363,953 B2
(45) Date of Patent: Apr. 29, 2008

(54) ASSEMBLY FORMED OF A TIRE AND A SEALING PIECE AND MANUFACTURING PROCESS

(75) Inventor: Olivier Ferlin, Malauzat (FR)

(73) Assignee: Michelin Rechercheet Technique S.A., Granges-Paccot (CH)

( * ) Notice: Subject to any disclaimer, the term of this patent is extended or adjusted under 35 U.S.C. 154(b) by 136 days.

(21) Appl. No.: 10/454,606

(22) Filed: Jun. 5, 2003

(65) Prior Publication Data
US 2003/0226632 A1  Dec. 11, 2003

Related U.S. Application Data

(63) Continuation of application No. PCT/EP01/14780, filed on Dec. 14, 2001.

(30) Foreign Application Priority Data
Dec. 22, 2000 (FR) ................... 00 17077

(51) Int. Cl.
*B60C 5/16* (2006.01)
*B60C 19/04* (2006.01)

(52) U.S. Cl. ...................... 152/453; 152/514
(58) Field of Classification Search ................ 152/453, 152/513, 514, 515, 192, 393, 381.4, DIG. 9; 156/118, 123, 126, 135
See application file for complete search history.

(56) References Cited

U.S. PATENT DOCUMENTS 1,295,604 A * 2/1919 Roberts ....................... 152/514
1,875,390 A * 9/1932 Musselman ................. 156/118
2,879,828 A * 3/1959 Lancaster et al. ......... 156/421.2
4,289,186 A * 9/1981 Wilde ....................... 152/379.3

FOREIGN PATENT DOCUMENTS

| DE | 1 035 500 | 7/1958 |
|---|---|---|
| DE | 24 17 104 | 10/1975 |
| DE | 195 42 982 A1 | 6/1996 |
| GB | 417509 | 10/1934 |
| WO | 98/21056 | 5/1998 |

OTHER PUBLICATIONS

Abstract and Machine translation for DE 19542982.*
Abstract and Machine translation for DE 19542982, Jun. 13, 1996.*

* cited by examiner

*Primary Examiner*—Geoffrey L. Knable
(74) *Attorney, Agent, or Firm*—Buchanan Ingersoll & Rooney PC

(57) ABSTRACT

An assembly comprising a tire (P) without an inner tube, provided with two beads and intended to be mounted on a mounting rim (J) comprising seats (440) extended radially towards the outside by flanges (R), and a rubber sealing piece (E) arranged between said rim and said tire, characterized in that the diameters (DP) of the tire bead seats are greater than the corresponding diameters (DJ) of the rim seats (440), said tire (P) being provided integrally with the sealing piece (E) formed of three parts which are integral with each other, a central part (51), made of material impermeable to the inflation gases, being placed axially between the beads of the tire, this central part (51) being extended axially beneath the beads of the tire by edges (50) integral with said beads, means being provided for facilitating the separation of the central part from the lateral parts.

A process for manufacturing such an assembly.

10 Claims, 2 Drawing Sheets

ASSEMBLY FORMED OF A TIRE AND A SEALING PIECE AND MANUFACTURING PROCESS

This application is a continuation of Application No. PCT/EP01/14780, filed on Dec. 14, 2001.

BACKGROUND OF THE INVENTION

The present invention relates to an assembly formed of a tubeless tire, intended to be mounted on a rim, and of a device intended to ensure airtightness between said rim and said tire. It relates more particularly to assemblies for heavy vehicles.

Patent FR 1 130 534 discloses an assembly of this type with a tire comprising internally a layer impermeable to the inflation gases generally used. The operating rim of said tire is a rim comprising seats which are only slightly inclined relative to the axis of rotation (flat seats or seats inclined by an angle equal to 5°). It comprises on either side of the rim base a fixed flange and a movable flange, locked by any suitable means, in particular by a slit locking ring which becomes lodged in a groove provided for this purpose. On the side of the fixed flange, whether the rim seat be flat or inclined at 5°, the bead of the tire becomes lodged on said seat and against the flange: a certain sealing effect results. On the other hand, on the side of the removable rim flange, the rim is not airtight, hence the necessity, for mounting and permitting correct running of the tubeless tire, of positioning a sealing piece of elastomeric material, which piece may be in the form of two edges having the form of corner irons in meridian section, said two edges being joined axially by a virtually flat band on which an inflation valve is arranged in airtight manner.

This sealing piece imparts the sealing necessary to the mounted assembly if the dimensions, in particular the thicknesses between beads and rim seats, are sufficient, at least over a consequent axial part.

GB 417509 describes a tire with which there is associated a sealing piece in the form of a ring having lateral parts fastened radially beneath the beads of the tire. However, this document does not describe or even suggest any means of making the separation of the sealing piece from the tire in order to access the interior of this tire easy and reliable.

In fact, and for various reasons linked to the tire, it is frequently necessary to dismount the assembly temporarily, in particular when said assembly is intended for travelling on more or less bumpy ground. For reasons in particular of safety, it is conventional to remount solely the tire on the same rim or a rim of the same type in the presence of an inner tube. There is then the problem of holding on the rim of the beads which are then devoid of the sealing piece: there may be pinching of the inner tube between the beads and the rim, or alternatively rotation of the tire on its rim when an intense torque is applied to the tire, or alternatively a completely uncontrolled axial movement of the beads relative to the rim.

In order to overcome such drawbacks and to permit the remounting of the tire, the invention proposes making the two edges of the sealing piece of elastomeric material be integral with the tire, thus making it possible to remount said tire after having dismounted the latter from its operating rim.

SUMMARY OF THE INVENTION

The assembly according to the invention comprises a tubeless tire, provided with two beads and intended to be mounted on a rim comprising seats extended radially towards the outside by flanges, and a rubber sealing piece arranged between said rim and said tire; this tire has diameters DP of bead seats which are greater than the corresponding diameters DJ of the mounting rim seats; furthermore, this tire is provided integrally with a sealing piece formed of three parts which are integral with each other, a central part, made of rubber mix impermeable to the inflation gases and placed axially between the beads of the tire, this central part being extended axially at least beneath the beads of the tire by two parts forming edges of material which is compression-resistant (and not necessarily impermeable to the inflation gases), these edges being integral with the beads of tire and separable from the central part. The sealing piece comprises means having the function of permitting localization of the separation zone between the edges and the central part of said piece in order to facilitate this separation by means of a cutting tool in particular avoiding damaging the beads of the tire.

In a first variant, these localization means take the form of a groove (or rib) oriented in the circumferential direction and formed on the face of the sealing piece intended to face the surface of the rim base; this groove (or rib) has an appropriate depth (or thickness) so as not to weaken the connection between the central part and the edges of the sealing piece when new. This groove (rib), at the time of removal of the central part, acts as a guide for a cutting tool for cutting the sealing piece between the central part and the edges in order to avoid damaging the bead of the tire while producing a satisfactory cut as early as the first separation test.

In another preferred variant which makes it possible easily to separate the parts of the sealing piece, this piece is producing by gluing between the central part and the edges in a preferably oblique plane at an angle $\alpha$ at most equal to 60° (angle measured relative to the axial direction); this gluing zone may be realized by the presence of a material of a different color from that of the sealing piece.

Preferably, the edges, viewed in meridian section, are in the form of strips of rubber mix which is resistant to the shocks and breaking which may be caused by the tools for mounting and dismounting the assembly on its rim. In order to obtain satisfactory clamping of the assembly on the rim in order to ensure good cooperation of this assembly with its rim, the average thickness of each edge is such that the difference between the average diameter of the rim seat and the average diameter measured on the part of the assembly intended to come into contact on said seat is between 0 and 4 mm.

"Clamping" is understood to mean the value of the compressive deformation of the materials present in the assembly beneath a rigid annular element to which a carcass reinforcement is anchored during the mounting on the operating rim. This clamping is defined by the following relationship:

$S=(DJ-DB)/(DT-DB)$, where:

DJ is the diameter of the rim measured on a line perpendicular to the axis of rotation of the assembly passing through the center of gravity of the meridian section of the bead-reinforcing bead wire, DT is the diameter of the base of the bead wire taken on the same perpendicular line, DB is the internal diameter of the assembly (tire/sealing piece) taken on the same perpendicular line.

Said clamping may be constant axially along the rim seat; it may also vary, as is known per se, owing to the possible differences between the rim seats and the seats of the beads provided with the sealing pieces. The clamping may increase from the flanges to the toe of the beads, but it may equally well decrease. Said variations in clamping may be obtained by varying the thickness of the edges of the sealing piece, or by varying the profile of the tire seat devoid of said piece.

Preferably, the edges, viewed in meridian section, are in the form of strips, having curved edges, of rubber mix which is resistant to the shocks and breaking which may be caused by the tools for mounting and dismounting the assembly on/from its rim, each curved part extending radially towards the outside that part of the edge located radially beneath each bead; these curved parts may advantageously be made of material resistant to wear by friction against the rim flanges.

The sealing piece may be made with a material which is identical for the central part and the edges, it being understood that this material must at least have sufficient airtightness characteristics and be able to be rendered integral with the beads of the tire. The material constituting the sealing piece may be any material having sufficient flexibility and also airtightness which permits both mounting and inflation (and not necessarily of rubber mix).

The permeability of the material of the central part is measured by a permeability coefficient c, measured at 80° C. in accordance with DIN Standard No. 53 536 and is expressed in m²/s. Pa. This coefficient will preferably be less than $7 \times 10^{-7}$ m²/s. Pa. The sealing piece may, for example, be fastened to the beads of a tire in order to form a closed tire assembly by gluing, using a bonding material which effects the gluing both to the bead and to the edge of said piece.

In order to permit the re-use of said tire on the same mounting rim (or a similar rim) with an inner tube while avoiding the problems of pinching of the tube after dismounting for repair of the tire requiring access to the inside of the tire, for example after perforation, the central part of the sealing piece is removed, leaving in place the edges of this piece beneath the beads of said tire; this is possible owing to the fact that the sealing piece was integral with the tire by its two edges. In this manner the tire provided with these edges may once again be easily mounted on the same operating rim with an inner tube.

The assembly tire/sealing piece made of rubber mix forms a whole and the process for manufacturing it comprises the following steps:

a) manufacture and vulcanization of a tire the diameters of the tire bead seats being no less than the diameters of the corresponding operating rim seats, b) manufacture of a non-vulcanized sealing piece of rubber mix by co-extrusion by means for example of a roller-die extruder, this piece comprising axial end parts forming edges, c) positioning of the sealing piece within the tire such that the beads of this tire bear on the edges and positioning of this assembly on an assembly drum having a radially expansible, cylindrical molding surface, this surface being limited axially by lateral parts axially limiting the axial displacement of the beads in the following stage, c) radial expansion of the assembly drum and inflation of the tire to a pressure sufficient to obtain suitable contact between the sealing piece and the beads of the tire, e) vulcanization of the sealing piece to make said piece integral with the tire by means of the molding surface brought to the temperature required for said vulcanization, f) dismounting of the assembly sealing piece/tire and storage as is.

When the edges of the sealing piece have curved parts, it is judicious to provide for the lateral parts limiting the axial displacement of the assembly on the assembly drum to have a meridian profile similar to the meridian profile of the operating rim.

Another alternative consists of producing an assembly according to the invention using a process comparable to the process used for renovating the tread of a tire after wear, for example, by arranging a non-vulcanized connecting rubber between the beads of a tire and the sealing piece which has been molded and vulcanized beforehand then by effecting pressurization and vulcanization of said connecting rubber.

BRIEF DESCRIPTION OF THE DRAWINGS

The characteristics of the invention will be better understood with reference to the following description, which refers to the drawings, which illustrate examples of embodiment in non-limitative manner, and in which.

DETAILED DESCRIPTION OF THE INVENTION

Figure 1:
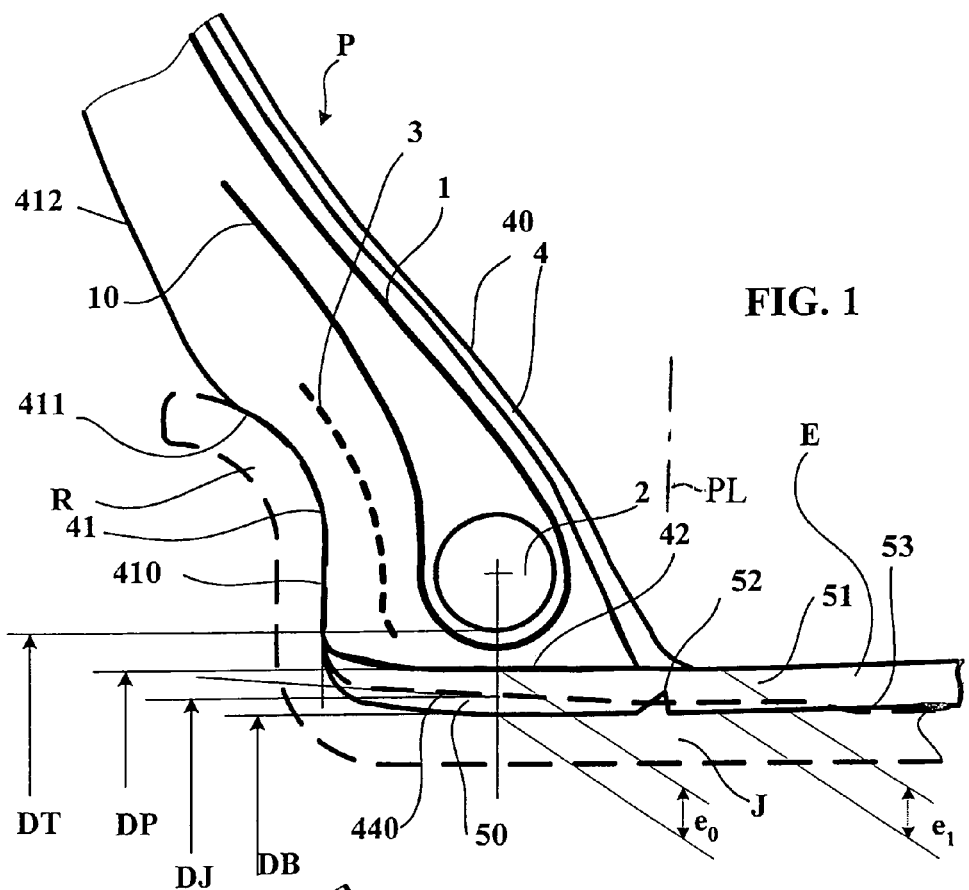
FIG. 1 shows partially a section through an assembly formed by a tire, a sealing piece and a rim.

The assembly not mounted on its rim, according to the invention, and shown partially in FIG. 1, is composed of a tire P without independent inner tube and a sealing piece E to be mounted on an operating rim J shown in broken lines. The tire P has a conventional structure and mainly comprises a metallic carcass reinforcement 1, radial in the case in question and anchored within each bead to at least one bead wire 2 to form an upturn 10. A reinforcement 3, formed of metal cables inclined relative to the circumferential direction, finishes off the reinforcement of each bead of the tire P. The bead has a wall formed:

axially to the inside of an internal face 40 of a layer 4 of rubber mix impermeable to the inflation gases, axially to the outside of an external face 41 partially perpendicular to the axis of rotation, comprising a vertical part 410 extended radially to the outside by a concave part 411, which in turn is extended by a sidewall part 412, and radially to the inside by a rounded part providing the join between the vertical part 410 and a bead seat 42 which is of frustoconical form in the example in question, said seat having a diameter which decreases regularly from its axially outer edge to its axially inner edge, constantly remaining greater than the corresponding diameter of the inclined seat 440 of the rim J (shown in broken lines).

Between the rim J and the tire P and in particular its beads, there is arranged the sealing piece E. Said piece is composed of three parts: two lateral parts, or end pieces 50 having the form of frustoconical crowns intended to be arranged, integrally, between the bead seat 42 and the rim seat 440. An axially outer end 50a of the end piece terminates adjacent a radially inner end of the wall 410. The thickness $e_0$ of the edges of the sealing piece E is measured on a line perpendicular to the axis of rotation assign through the center of gravity of the anchoring bead wire 2 and is equal to the difference (DP-DB), DP being the diameter on said perpendicular line of the bead of the tire P and DB being the internal diameter of the crown 50 of the sealing piece E. This thickness $e_0$ is determined such that there is appropriate clamping of the assembly (tire/sealing piece) on the rim J between the bead wire 2 and said rim.

Axially between the lateral parts 50, of axial width substantially equal to the axial width of the base 42 of the tire bead, there is a central part 51 which may have a thickness $e_1$, greater than the thickness $e_0$ of the lateral parts 50, and which is provided with an orifice necessary for the laying of a valve spud. In the vicinity of the axially inner part of each bead (corresponding to the intersection of the walls 40. and 42), there is provided a groove 52 extending circumferentially over the radially inner face 53 of the sealing piece E and over only part of the thickness of the sealing piece. This groove is positioned substantially between the central part 51 and one of the lateral parts 50 of the sealing piece and has the function of permitting correctly located and easy cutting-out of the central part without causing any damage to the beads. This groove 52 acts both as a marker for positioning the cutting tool and as a guide for this tool for separating the central part 51 from the lateral parts 50. Each groove extends radially outwardly to a point located radially outwardly in relation to an axially adjacent inwardly facing rim-engaging surfaces of a respective edge piece 50. As can be seen from the figures, the sealing piece is configured such that the central part is placed axially between both the beads and the lateral parts so that the entire center part 51 is disposed axially within a region defined between two planes PL that are spaced apart along the rotation axis, of the tire assembly and oriented perpendicular to the axis, each plane intersecting the sealing piece at a respective location between each lateral part and the central part.

For convenience, there is shown in FIG. 1 the assembly tire/sealing piece when new not mounted and not inflated and in the same figure a section through the mounting rim J in broken lines comprising a rim seat of frustoconical surface 440 extended axially and radially to the outside by a flange R; using to this representation, it is easy to understand the clamping of the materials of the tire and of the sealing piece beneath the bead wire 2 in the beads during mounting on this rim of the assembly according to the invention. The rubber mix constituting the lateral parts 50 of the piece E and the central part is a single mix based on butyl elastomer, which has the special features of having good impermeability.

Thus, when the assembly in question is required to be dismounted and when examination of the inside of the tire is made necessary, the central part 51 of the sealing piece is separated from the lateral parts 50 by cutting out by means of an appropriate tool.

Figure 2:
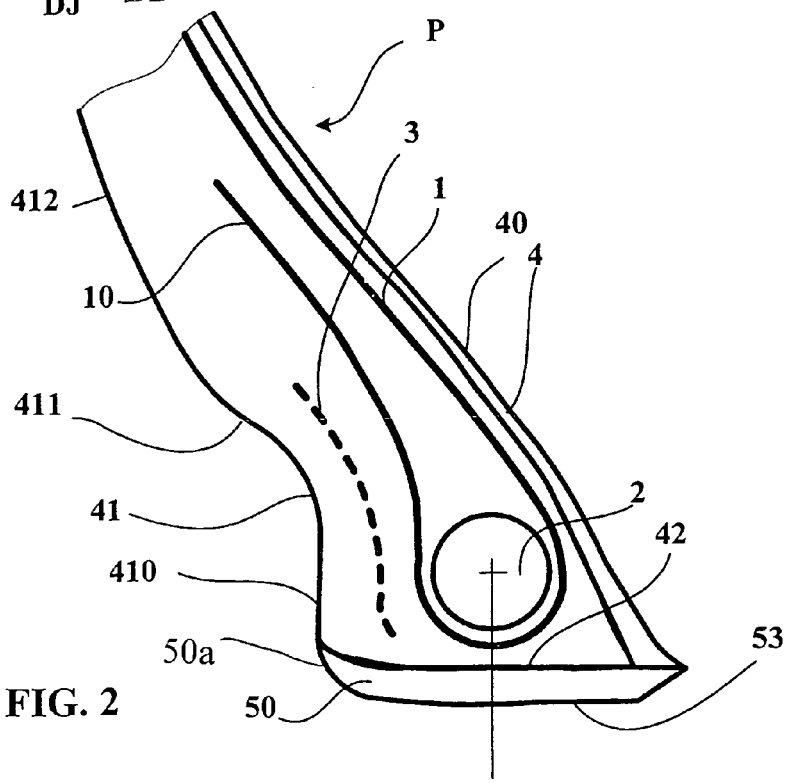
FIG. 2 is a view of the same assembly after the central part of the sealing piece has been removed.

The lateral parts 50 remaining on the tire, said tire, as shown in FIG. 2 after cutting out the sealing piece and removing the central part 51, may, after repair or other handling operation, be remounted easily on a rim of the same type with an independent inner tube and without the central part 51, and be re-used under normal conditions of safety and yield.

Figure 3:
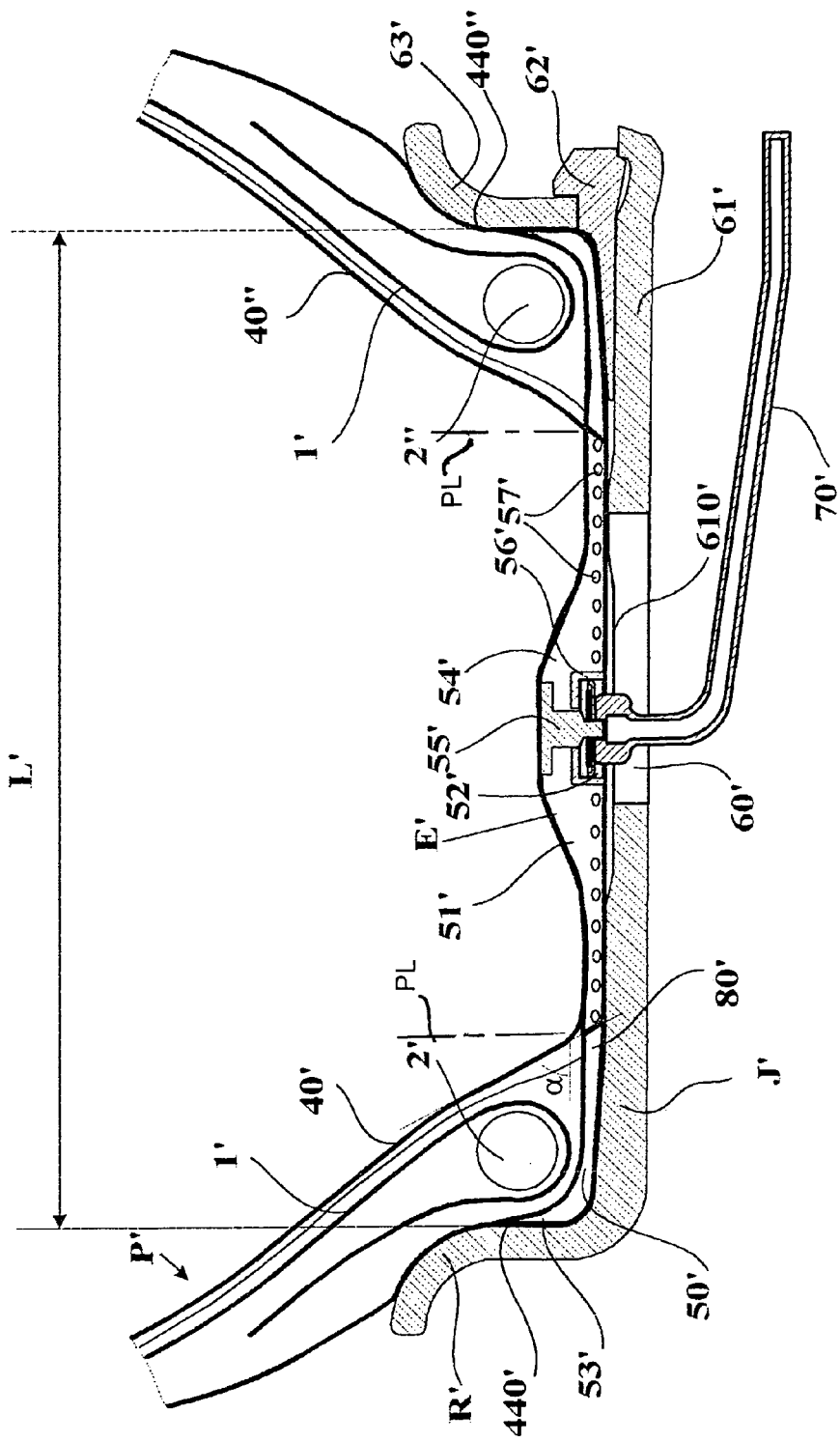
FIG. 3 shows another variant of an assembly according to the invention mounted on an operating rim.

FIG. 3 shows a partial cross-section through another variant of an assembly according to the invention, comprising a tire P' of dimension 11.00 R 20 and a sealing piece E', mounted and inflated on an operating rim J'. In this variant, the tire comprises a radial carcass reinforcement 1' anchored within each bead to a bead wire 2', 2". This tire P has a diameter measured beneath the beads and beneath the bead wires 2' which is greater by 6 mm than the corresponding diameter of its mounting rim. Before mounting, the tire is made integral with a sealing piece E' of cylindrical general geometry formed of a central part 51' extended axially by lateral parts comprising a part 50' intended to be in contact with the seat of the bead, this part 50' in turn being extended axially and radially towards the outside by a flange 53' extending along the vertical outer wall of the bead. Each lateral part has a thickness of 3 mm.

In the case shown, the central part 51' is made of a mixture based on butyl elastomer and has an average thickness of 3 mm, which has the special features of having good impermeability and not having very great cured tackiness on the other mixtures whereas the lateral parts are formed of a rubber mix commonly used for the protective layer of tire beads.

The join 80' between the lateral parts 50' and the central part 51', viewed in meridian section, is an oblique join forming an angle α with the axis of rotation substantially equal to 45°, said join being substantially in the extension of the inner wall 40' of the bead. This join 80 is made visible either by the fact that the rubbers of the three parts of the piece E are of different colors, or by the fact that said join is shown by a fine layer of color. Using a mixture based on butyl for the central part facilitates the separation along the interface between said central part and the lateral parts simply by pulling the more or less tapered parts from said central part.

The operating rim J' on which the assembly described is mounted comprises a first part 61' limited axially by a first hook R' integral with this part 61' and, mounted removably to permit the mounting and the dismounting of said assembly, a second hook 63' locked on to the first part 61' by a locking element 62', part of the radial outer surface of which constitutes a seat for the assembly.

Preferably, the axial width between the beads of the non-mounted assembly is less than the axial width L' between the rim flanges R' and 63' and the central part 51' is elastic and deformable in the axial direction under the action of the inflation pressure in order to effect proper mounting of the assembly on the rim and proper contact of the vertical outer walls 440', 440" of the beads against the rim flanges.

Furthermore, and in order to permit the inflation of the mounted assembly, an inflation valve is provided which is fastened removably by means of a valve stem 70' on a valve spud 55', which in turn is fastened integrally to a widened portion 54' of the central part of the sealing piece 51'. This valve stem 70' is provided to pass through a window 60' passing through the rim base 610', visible in FIG. 3, which is closed at both its ends. To permit easy mounting and dismounting of the assembly, it is advantageous for the valve spud 55' to be mounted on the central part 51' such that the radially inner end of the means for fastening the valve stem on said spud is located entirely within the thickness of said central part. In practice, these fastening means are located completely within a housing 52' formed on the sealing piece E and opening onto the face radially to the inside of said piece. Thus the radially inner end of the fastening means, which does not extend past the central part, does not risk coming into contact with the rim and does not risk hampering the dismounting by axial displacement of the assembly on its operating rim.

For the mounting, the valve stem may be fastened to the spud even before effecting said mounting once the central part 51' is sufficiently elastically deformable to permit the introduction of the valve stem 70' into the window 60'. The assembly is slipped on to its operating rim devoid of its removable flange 63' and the locking elements 62', the valve stem sliding over the rim base 610' before passing into the window 60'; the mounting operation is then continued until it has been completely put in place on the rim base and the removable flange 63' has been put in place, and then by the inflation of the assembly in order to put said assembly in place against the seats and the rim flanges. To effect the mounting operation, it may be judicious to effect a slight pressure reduction in the assembly in order to cause the beads to move slightly towards each other, resulting in an increase in diameter of the central part bearing the valve spud so as to promote the sliding of the valve stem on the rim base.

For the dismounting, it is possible to proceed similarly in reverse order after having deflated the assembly (or even to effect a slight pressure reduction if the state of said assembly permits); it is also possible to disconnect the valve stem from the valve spud, the assembly then being able to slide over the rim base because there is no element of the spud to hamper the axial movement.

Preferably, the central part is reinforced circumferentially to reduce or even prevent its permanent deformation within the window 60' and then hampering dismounting. The reinforcements 57', in the form of cables or cords, may, in particular but not exclusively, be oriented at a slight angle of 0° to 5° relative to the circumferential direction; these same reinforcements, limited to the central part, may extend as far as the join 80' and may act as a guide for the cutting tool used to separate the central part and lateral parts; preferably the angle of the reinforcements is at most equal to 45° (angle measured relative to the circumferential direction). It is also possible to provide for the presence of reinforcements in the form of cables or cords or fabrics in each lateral part or at the surface of each of said parts in order to protect this part.

Still with the same objective, it is advantageous to reinforce the housing 52' of the valve spud within which is provided the means for connecting the valve stem to said spud. One solution for reinforcement, shown with the embodiment of FIG. 3, consists of incorporating in the central part a reinforcement 56' of cylindrical general form having an axis substantially perpendicular to said internal face of compression-resistant material bearing on the rim base 610' on either side of the window 60' in the circumferential direction; this cylinder 56' which is open on the radially inner face of the central part 51' opposes the deformation of said part within the window while keeping the valve spud at a sufficient distance from the rim base.

In order, after prolonged use over time, to prevent the central part which comes into contact with the rim base from adhering to a greater or lesser extent to this surface, it is judicious to provide an anti-sticking treatment to the face of the central part opposite the rim base.

Finally, as a safety measure, the assemblies may be provided with safety means intended to prevent an assembly according to the invention from being able to be inflated beyond a limit pressure when said assembly is not mounted on a rim.

The invention is not limited to the examples described and shown, and various modifications can be made thereto without departing from the scope thereof.

What is claimed is:

1. A heavy vehicle tire assembly, comprising a tire (P) without an inner tube, provided with two beads and bead seats and intended to be mounted on a mounting rim (J) comprising a rim base extended axially by rim seats which in turn are extended radially towards the outside by flanges (R), and a rubber sealing piece (E) arranged between said rim and said tire, the diameters (DP) of the tire bead seats being greater than the corresponding diameters (DJ) of the rim seats, this tire (P) being provided integrally with the sealing piece (E) formed of three axially adjacent parts comprising two lateral parts and a central part which are integral with each other, the central part, made of material impermeable to the inflation gases, being placed axially between the beads of the tire so that the entire central part is located axially within a region defined between two planes spaced apart along the rotation axis of the tire assembly and oriented perpendicular to the axis, each plane intersecting the sealing piece at a respective location between each lateral part and the central part, this central part being extended axially beneath the beads of the tire by the lateral parts which are integral with respective beads and of an axial width substantially equal to the axial width of the respective bead seat, this tire (P) being characterized in that the sealing piece (E) comprises two location means each defining and allowing location of a zone of separation between a respective lateral part and the central part of the sealing piece (E) in order to facilitate separation of the central part from the lateral parts without damaging the beads of the tire, each location means disposed radially inwardly in relation to a respective bead, each bead including a generally radial wall facing axially outwardly, an axially outer end of each edge piece terminating adjacent a radially inner end of the generally radial wall of the respective bead.

2. The assembly according to claim 1 wherein the location means comprise in the vicinity of each bead a groove oriented in a circumferential direction on the radially inner face of the sealing piece, the groove formed within the thickness of the sealing piece.

3. The assembly according to claim 1 wherein the lateral parts of the sealing piece (E) are glued to the central part along frustoconical surfaces forming, with the axial direction, an angle $\alpha$ at most equal to 60° and in that the location means comprise a material of a different color from that of the sealing piece on the gluing surface.

4. The assembly according to claim 1 wherein the lateral parts of the sealing piece (E), viewed in meridian section, are in the form of strips having curved edges of material which is resistant to shocks and breaking which may be caused by the tools for mounting and dismounting the assembly on or from its rim, each curved edge extending radially towards the outside with respect to that part of the edge located radially beneath each bead.

5. The assembly according to claim 1 wherein the central part of the sealing piece is made from a material having appropriate airtightness characteristics and in that the lateral parts of said sealing piece are produced from a different material essentially resistant to shocks and breaking.

6. The assembly according to claim 1 wherein at least the central part of the sealing piece (F) is reinforced circumferentially by reinforcements in the form of cables or cords forming an angle at most equal to 45° with the circumferential direction.

7. The assembly according to claim 6 wherein the sealing piece comprises a valve spud having means for fastening a valve stem, these fastening means being located completely within a housing formed on the sealing piece (E) and opening onto the face radially to the inside of said sealing piece for permitting and facilitating the mounting and dismounting by axial displacement of the assembly on its operating rim.

8. The assembly according to claim 7 wherein the mounting rim comprises a window passing through the rim base for the passage of the valve stem and in that the housing provided on the inner face of the sealing piece comprises a reinforcement of cylindrical general form opening on to said inner face and being of dimension greater than the width of the window, said reinforcement being of compression-resistant material in order to oppose deformation of the sealing piece within the window.

9. The assembly according to claim 1 wherein the location means comprise in the vicinity of each bead a rib oriented in the circumferential direction on a radially inner face of the sealing piece.

10. An assembly comprising a tire (P) without an inner tube, provided with two beads and intended to be mounted on a mounting rim (J) comprising a rim base extended axially by seats which in turn are extended radially towards the outside by flanges (R), and a rubber sealing piece (E) arranged between said rim and said tire, the diameters (DP) of the tire bead seats being greater than the corresponding diameters (DJ) of the rim seats, this tire (P) being provided integrally with the sealing piece (E) formed of three axially adjacent parts comprising two lateral parts and a central part which are integral with each other, the central part, made of material impermeable to the inflation gases, being placed axially between the beads of the tire, this central part being extended axially beneath the beads of the tire by the lateral parts which are integral with respective beads, this tire (P) being characterized in that the sealing piece (E) comprises location means defining and allowing location of a zone of separation between the lateral parts and the central part of the sealing piece (E) in order to facilitate separation of the central part without damaging the beads of the tire, wherein the lateral parts of the sealing piece are glued to the central part along frustoconical surfaces forming, with the axial direction, an angle a at most equal to 60° and in that the location means comprise a material of a different color from that of the sealing piece on the gluing surface.

* * * * *